US008910180B2

(12) United States Patent
Ng et al.

(10) Patent No.: US 8,910,180 B2
(45) Date of Patent: *Dec. 9, 2014

(54) INTERDEPENDENT TASK MANAGEMENT BY EXECUTING TASKS BASED ON THE "FOR ALL" TASK ATTRIBUTES AND EXISTENCE OF SEMAPHORE IN A TASK DEPENDENCY CHAIN

(75) Inventors: Walfrey Ng, Ontario (CA); Chenfei Song, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,235

(22) Filed: Sep. 15, 2012

(65) Prior Publication Data

US 2013/0019250 A1 Jan. 17, 2013

Related U.S. Application Data

(63) Continuation of application No. 12/912,141, filed on Oct. 26, 2010.

(30) Foreign Application Priority Data

Jan. 28, 2010 (CA) ..................................... 2961306

(51) Int. Cl.
*G06F 9/46* (2006.01)
*G06F 9/54* (2006.01)
*G06F 9/44* (2006.01)

(52) U.S. Cl.
CPC ... *G06F 8/71* (2013.01); *G06F 8/70* (2013.01); *G06F 8/74* (2013.01); *G06F 9/54* (2013.01); *G06F 9/51* (2013.01)

USPC ........... 718/106; 718/102; 717/162; 717/163; 717/120

(58) Field of Classification Search
USPC ............................ 718/102, 106; 717/162, 163
See application file for complete search history.

(56) References Cited

U.S. PATENT DOCUMENTS

| 6,742,083 | B1 | 5/2004 | Greicar |
| 7,086,063 | B1 * | 8/2006 | Ousterhout et al. .......... 718/106 |

(Continued)

OTHER PUBLICATIONS

Chris MonSon, LaTeX Makefile, 2004, http://www.cs.cmu.edu/; http://www.cs.cmu.edu/afs/.cs.cmu.edu/Web/People/16831-f12/scribeTemplate/16831_lecture00_andrewid/Makefile.*

(Continued)

*Primary Examiner* — Abdullah Al Kawsar
*Assistant Examiner* — Abu Ghaffari
(74) *Attorney, Agent, or Firm* — Yudell Isidore PLLC; Parashos Kalaitzis

(57) ABSTRACT

An illustrative embodiment of a computer-implemented process for interdependent task management selects a task from an execution task dependency chain to form a selected task, wherein a type selected from a set of types including "forAll," "runOnce" and none is associated with the selected task and determines whether there is a "forAll" task. Responsive to a determination that there is no "forAll" task, determines whether there is a "runOnce" task and responsive to a determination that there is a "runOnce" task further determines whether there is a semaphore for the selected task. Responsive to a determination that there is a semaphore for the selected task, the computer-implemented process determines whether the semaphore is "on" for the selected task and responsive to a determination that the semaphore is "on," sets the semaphore "off" and executes the selected task.

11 Claims, 4 Drawing Sheets

(56) References Cited

U.S. PATENT DOCUMENTS

| | | | |
|---|---|---|---|
| 7,263,695 B1* | 8/2007 | Muzaffar et al. | 717/162 |
| 7,395,529 B1 | 7/2008 | Stanton et al. | |
| 7,509,633 B2* | 3/2009 | Nesbitt et al. | 717/140 |
| 7,904,892 B2* | 3/2011 | Babb et al. | 717/144 |
| 8,042,102 B2 | 10/2011 | Dewitt et al. | 717/128 |
| 8,122,440 B1* | 2/2012 | Lentini et al. | 717/141 |
| 8,191,052 B2 | 5/2012 | Chamieh et al. | |
| 8,250,131 B1 | 8/2012 | Pulsipher | |
| 2002/0199170 A1* | 12/2002 | Jameson | 717/120 |
| 2004/0268308 A1* | 12/2004 | Srivastava et al. | 717/120 |
| 2005/0262482 A1 | 11/2005 | Wagner et al. | |
| 2006/0064681 A1* | 3/2006 | Robinson | 717/141 |
| 2007/0150899 A1* | 6/2007 | Nankaku et al. | 718/107 |
| 2008/0127136 A1* | 5/2008 | Hino et al. | 717/140 |
| 2010/0262948 A1* | 10/2010 | Melski et al. | 717/101 |

OTHER PUBLICATIONS

U.S. Appl. No. 12/912,141 entitled "Interdependent Task Management"; Non-final office action dated Nov. 9, 2012. (22 pg.).

Riou, Matthieu, Raven: Scripting Java Builds with Ruby, 2006, Apress, New York, NY. (64 pg.).

U.S. Appl. No. 12/912,141 entitled "Interdependent Task Management"; Non-final office action dated Feb. 27, 2014.

U.S. Appl. No. 12/912,141 entitled "Interdependent Task Management"; Final office action dated Apr. 25, 2013.

\* cited by examiner

INTERDEPENDENT TASK MANAGEMENT BY EXECUTING TASKS BASED ON THE "FOR ALL" TASK ATTRIBUTES AND EXISTENCE OF SEMAPHORE IN A TASK DEPENDENCY CHAIN

PRIORITY CLAIM

The present application claims benefit of priority under 35 USC §120 and §365 to the previously filed Canadian Patent Application No. 2961306 entitled, "Interdependent Task Management" with a priority date of Jan. 28, 2010. The present application is a continuation of U.S. patent application Ser. No. 12/912,141, filed on Oct. 26, 2010, titled "Interdependent Task Management". The content of these applications is incorporated by reference herein.

BACKGROUND

1. Technical Field

This disclosure relates generally to configuration and build environments in a data processing system and more specifically to interdependent task management for configuration and build environments in data processing systems.

2. Description of the Related Art

A defined build process is a required overhead task that ensures software in a development project is repeatedly built in the same manner each time a build is executed. As the build process becomes more complex due to scale of additional tasks or combinations of tasks there is an increased need to achieve standardization. Standardization requires effective management of the process and therefore the sequencing of operations.

An effectively defined and managed build process is an essential part of any development cycle. Typically an effectively managed build process removes many issues related to build and configuration operations that may lead to increased cost in the form of project time and money. A typical tool used by developers for build process management is a tool called Ant. Ant is a platform-independent scripting tool. Ant enables a software developer to construct build scripts used to automate the build or configuration process for a configuration project. Ant is a project that is managed by and available by download from the Apache Software Foundation as part of the Jakarta project.

A configuration project, for example build automation, consists of multiple tasks and prerequisite tasks in a predetermined sequence. A requirement is that the project should be able to run in either of two modes. In a first mode the entire project is executed to build up the environment and is referred to as the build mode. In a second mode, only one or more of the tasks are executed to configure certain portions of the already built environment and is referred to as the configure mode.

For example, in the project prerequisite task 1 is an environment setup general task. Prerequisite task 1 is therefore required by each single task. Prerequisite task 1 may also contain subtasks similar to prerequisite task 2 or prerequisite task 3, and is required to be executed only once per execution, in either build mode or configure mode.

Certain tasks, such as a prerequisite task 2 and a prerequisite task 3 are required by more than one task. These prerequisite tasks can only invoked once per execution cycle, in either of the build mode or configuration mode. Prerequisite task 2 is a time-consuming task. Invoking prerequisite task 2 more than once means a performance loss. Prerequisite task 3 is a task such as decrypting a password. Invoking prerequisite task 3 more than once per cycle means a functional error. A difficulty arises when defining a dependency relationship to enable flexible execution of the project in either of the two modes, while meeting the requirement of running certain tasks only once per execution.

The Ant build tool provides a keyword of "depends" to solve part of the inter-dependency issue, but not a complete solution. Ant uses the keyword "depends" to describe the dependency relationship and the parent tasks are executed before the depending ones.

For example, using ANT, in a first case, explicitly declares each dependency relationship as the following: Task 1 (default task) depends Prereq1, Prereq3; Task 2 depends Prereq1, Prereq2; Task 3 depends Prereq1, Prereq2; ... Task n depends Prereq1, Prereq3, Prereqn. When running in the build mode, Prereq1, Prereq2 and Prereq3 are executed repeatedly. Using Ant, in a second case, declare Prereq1 for the default task only Task 1 (default task) depends Prereq1, Prereq3; Task 2 depends Prereq2; Task 3 depends Prereq2; ... Task n depends Prereq3, Prereqn. The second case solves the problem for Prereq1 in only the build mode. A Prereq2 and Prereq3 problem still exists. However a new problem is encountered, because of the change, which is Prereq1 is missing when running the script in configure mode, for instance, Task 2 only.

BRIEF SUMMARY

According to one embodiment, a computer-implemented process for interdependent task management selects a task from an execution task dependency chain to form a selected task, wherein a type selected from a set of types including "forAll," "runOnce" and none is associated with the selected task and determines whether there is a "forAll" task. Responsive to a determination that there is no "forAll" task, determines whether there is a "runOnce" task and responsive to a determination that there is a "runOnce" task further determines whether there is a semaphore for the selected task. Responsive to a determination that there is a semaphore for the selected task, the computer-implemented process determines whether the semaphore is "on" for the selected task and responsive to a determination that the semaphore is "on," sets the semaphore "off" and executes the selected task.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
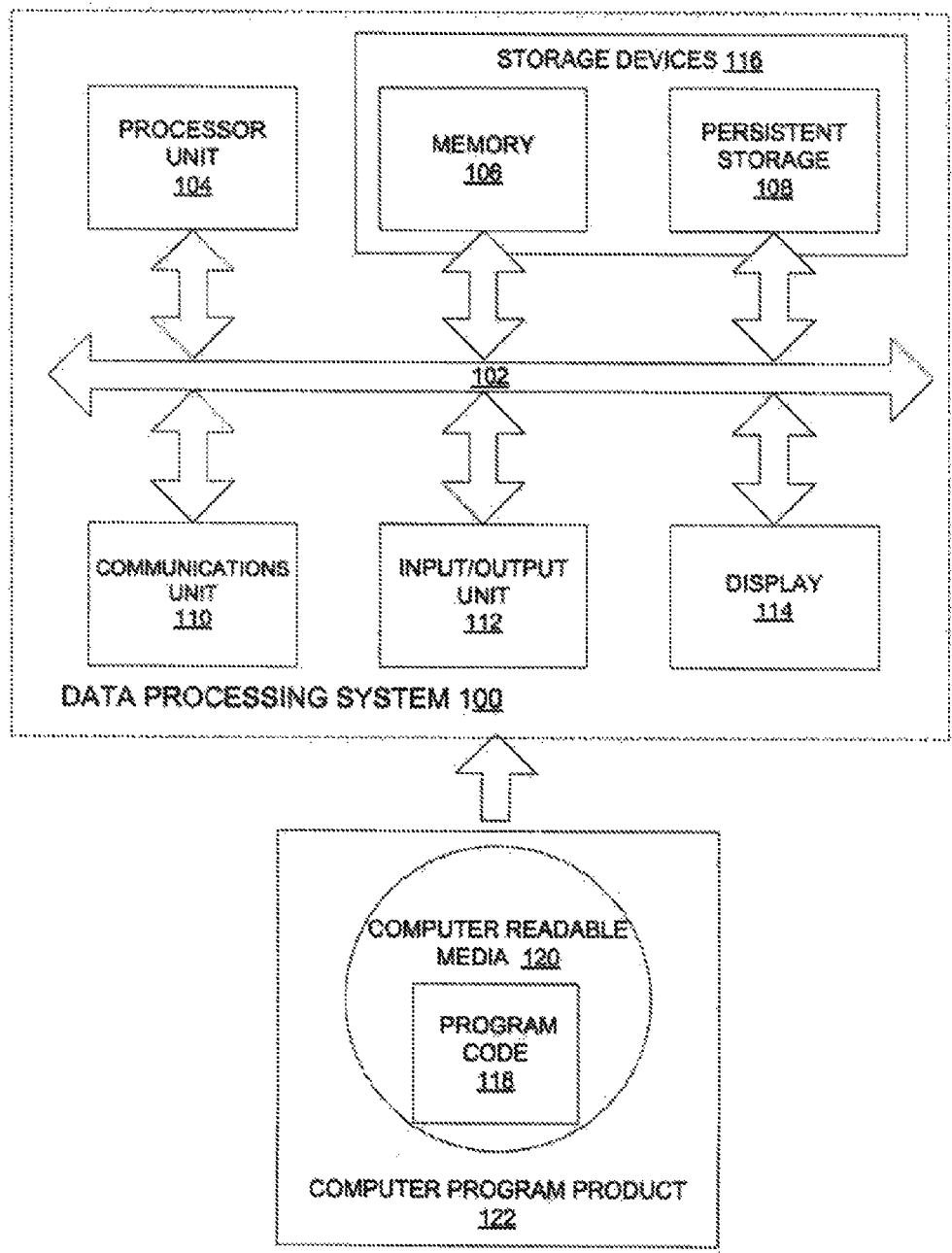
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Using data processing system 100 of FIG. 1 as an example, an illustrative embodiment provides the computer-implemented process stored in memory 106, executed by processor unit 104, for interdependent task management. Processor unit 104 selects a task from an execution task dependency chain to form a selected task, wherein a type selected from a set of types including "forAll," "runOnce" and none is associated with the selected task and determines whether there is a "forAll" task. Responsive to a determination that there is no "forAll" task, processor unit 104 determines whether there is a "runOnce" task and responsive to a determination that there is a "runOnce" task further determines whether there is a semaphore for the selected task. Responsive to a determination that there is a semaphore for the selected task, processor unit 104 further determines whether the semaphore is "on" for the selected task and responsive to a determination that the semaphore is "on," sets the semaphore "off" and executes the selected task.

In another example, a computer-implemented process, using program code 118 stored in memory 106 or as a computer program product 122, for interdependent task management selects a task from an execution task dependency chain to form a selected task, wherein a type selected from a set of types including "forAll," "runOnce" and none is associated with the selected task and determines whether there is a "forAll" task. Responsive to a determination that there is no "forAll" task, determines whether there is a "runOnce" task and responsive to a determination that there is a "runOnce" task further determines whether there is a semaphore for the selected task. Responsive to a determination that there is a semaphore for the selected task, the computer-implemented process determines whether the semaphore is "on" for the selected task and responsive to a determination that the semaphore is "on," sets the semaphore "off" and executes the selected task.

In an alternative embodiment, program code 118 containing the computer-implemented process may be stored within computer readable media 120 as computer program product 122. In another illustrative embodiment, the process for interdependent task management may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
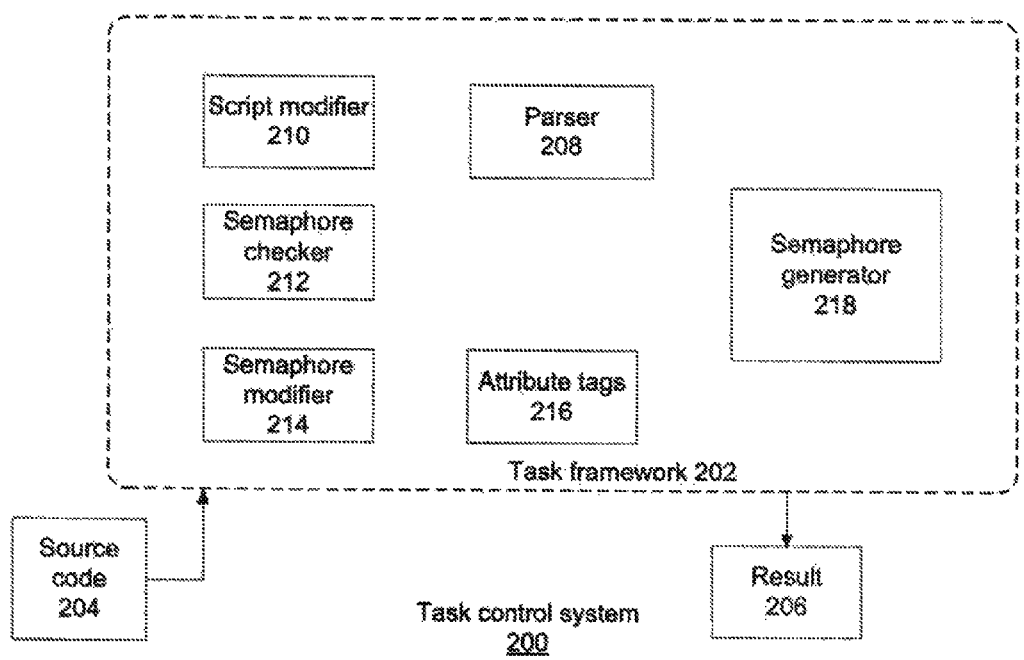
FIG. 2 is a block diagram of a task control system, in accordance with various embodiments of the disclosure.

With reference to FIG. 2, a block diagram of a task control system, in accordance with various embodiments of the disclosure is presented. Task control system 200 is an example, in an illustrative embodiment, of a project task management or control system. Task control system 200 comprises a number of components including task framework 202, source code 204, and result 206.

Other solutions have taken differing approaches to manage build issues. In one example a tool provided changes in dependency handling in an interactive development environment. The tool typically focused on limiting resources to rebuild when changes occur in an interactive environment in order to save build time. In this example, the tool stores component objects in one or more containers and removes redundant objects based on comparison results. Task control system 200 differs from the tool of the example because task control system 200 controls tasks during execution time, semaphore is used to determine if a prerequisite task need to be executed. Task control system 200 does not store an object being processed nor is there a need to perform a comparison of objects being processed.

In another example a build tool is used to achieve the requirement of "execute dependency tasks per build", but the tool executes all of the dependency tasks only once.

Task control system 200 differentiates the run-once dependency tasks from other tasks that can execute multiple times per build as required. Neither example provide a capability of dynamically adding a dependency on a general environment setup task for executing the task in either a configure mode or a build mode and a capability of ensuring that certain prerequisite tasks are invoked and executed only once in either a configure mode or a build mode.

Source code 204 is processed through task framework 202 to produce result 206. Source code 204 comprises program source code used in a build, configuration or other process to be managed by task control system 200 using task framework 202. For example, source code 204 in a build or configuration process is typically provided in the form of a script but other forms of programming language constructs may be used as well. In the build or configuration process example, the script includes a sequence of named or identified tasks having a presumed sequence of processing.

Result 206, in the example of a build or configuration script, is a modified build or configuration script that may be executed in a step wise or a stream manner as required. The modified script, in the example, includes the use of task control information added during processing by task framework 202.

Task framework 202 comprises a number of supporting components including parser 208, script modifier 210, semaphore checker 212, semaphore modifier 214, attribute tags 216, and semaphore generator 218. Task framework 202 provides a capability to define, parse and understand the definition of special prerequisite tasks. The capability also provides a method to dynamically add a dependency to a defined general environment setup task, so that the task will be invoked in either a build or a configuration execution mode, and a method to ensure certain tasks are invoked only once per execution cycle. The capability of task framework 202 typically ensures that a general environment setup task will not execute "run-once" tasks more than once in an execution cycle. The framework hides the complexity from the script writers, enabling script users to mark special tasks, and allow the process to be managed by the framework.

Parser 208 parses the incoming set of tasks as provided by source code 204. In the example of a build script, parser 208 would receive the input as source code 204 and analyze the syntax and semantics of the code sequences. Parser 208 may be a typical parser capable of parsing a language of source code 204.

Script modifier 210 provides a capability of editing and modifying the content of source code 204 received from parser 208. Modification typically includes insertion of attribute tags selected from attributes tags 216. Typical attribute tags include tags for attribute types such as "run once," and "for all." Special tasks as defined within task framework 202 introduce an attribute name 'type.' A general environment setup task will have a type="forAll," while a run-once task has an attribute type="runOnce." A normal task does not include an attribute 'type' and is simply processed when encountered.

Semaphore checker 212 provides a capability to monitor the status of a semaphore associated with each task in the parsed set of tasks provided by parser 208. A semaphore is an indicator used to provide a signal to other process. For example, in the illustrative embodiment a semaphore may have a value or setting of on or off. For example, a setting of on can be indicated by a "green" value and a setting of off can be indicated by "red" value. The value indicates the status of the associated task and may be used to determine an action within the process. Other values may be used to indicate the setting of the semaphore. In a simple case such as the task framework requires the setting of a semaphore is of a binary nature, either on or off. Other uses may include specific values in a range or set of values depending upon associated use of the semaphore.

Semaphore modifier 214 provides a capability to modify the setting of the semaphore value for an associated task. For example, when a semaphore is currently set to "green" a result of a process operation may cause the value to be set to "red" indicating a change to "red" status. In this example, the process operation requests semaphore modifier to perform the change in semaphore value to correctly indicate the status of the task. Semaphore modifier 214 also changes a newly created semaphore associated with a task to a desired value on request according to a process of task framework 202.

Semaphore generator 218 provides a capability to create semaphores for tasks that did not previously have a semaphore. For example, upon a determination that a task being processed does not have a semaphore, the process of task framework 202 would call semaphore generator 218 to create a semaphore for the task. Task framework 202 manages the execution of interdependent tasks according to the task dependencies using the associated attribute tags and semaphore values of each task.

Figure 3:
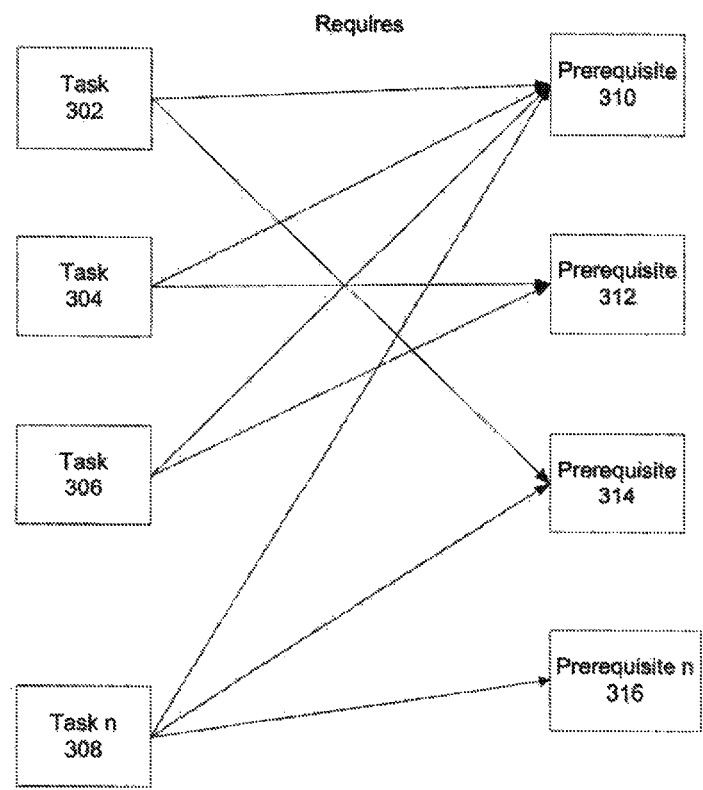
FIG. 3 is a block diagram of an interdependent task relationship in a task control system of FIG. 2, in accordance with one embodiment of the disclosure.

With reference to FIG. 3, a block diagram of an interdependent task relationship in a task control system of FIG. 2, in accordance with one embodiment of the disclosure is presented. Interdependent task relationship 300 is an example of a set of relationships among tasks as may be found in a typical configuration process or a build process. The tasks of interdependent task relationship 300 represent a set of tasks having defined relationships that include dependencies. The dependencies prescribe a sequence of execution including execute once for each execution cycle, and execute each execution cycle. A further dependency also includes execution according to a process type such as a configuration process or a build process.

Arrows between selected tasks of task 302, task 304, task 306, and task n 308 and respective prerequisites of perquisite 310, perquisite 312, perquisite 314, and perquisite n 316 define interdependent relationships. The interdependent relationships indicate whether a task requires a respective prerequisite. The prerequisite may be another task or other element in the task management process. Task framework 202 of FIG. 2 defined special tasks, introducing an attribute name 'type.' For example, perquisite 310 is a general environment setup task of a type="forAll." Prerequisite 312 is a task that is required to be run once per execution cycle and therefore has a type="runOnce." Other tasks that are normal tasks do not include an attribute 'type.' A type therefore may be selected from a set of types including "forAll," "runOnce" and none and is associated with the selected task. A selected task having a type of none is typically found without a type attribute but may be explicitly typed with type="none" as well.

For example, using an ANT framework for task management, task 302 is a default task that has a dependency on Prerequisite 314. Task 304 has a dependency on prerequisite 312, task 306 has a dependency on prerequisite 312, and task n 308 depends on prerequisite 314 and prerequisite n 316. Further, a type="forAll" is associated with prerequisite 310, a type="runOnce" is associated with Prerequisite 314 and a type="runOnce" is associated with prerequisite 312.

Ant provides a capability to load the list of tasks to be executed at execution time. The list of tasks starts from the task name specified by the user when in configure mode or starts from the default task name when in build mode. Ant may further be used to parse the dependencies and compute the execution sequence tasks. The enhancements using the dependency attributes of task control system 200 in the illustrative embodiment of FIG. 2 now identify type="forAll" task and add a dependency from the first task in the execution sequence to the selected task being processed task. The mechanism of task framework 202 of FIG. 2 also is used to identify tasks having a type='runOnce.' A semaphore flag is created for each of these tasks. The framework also checks the corresponding semaphore before executing the task, and updates the corresponding semaphore after the task is executed.

Figure 4:
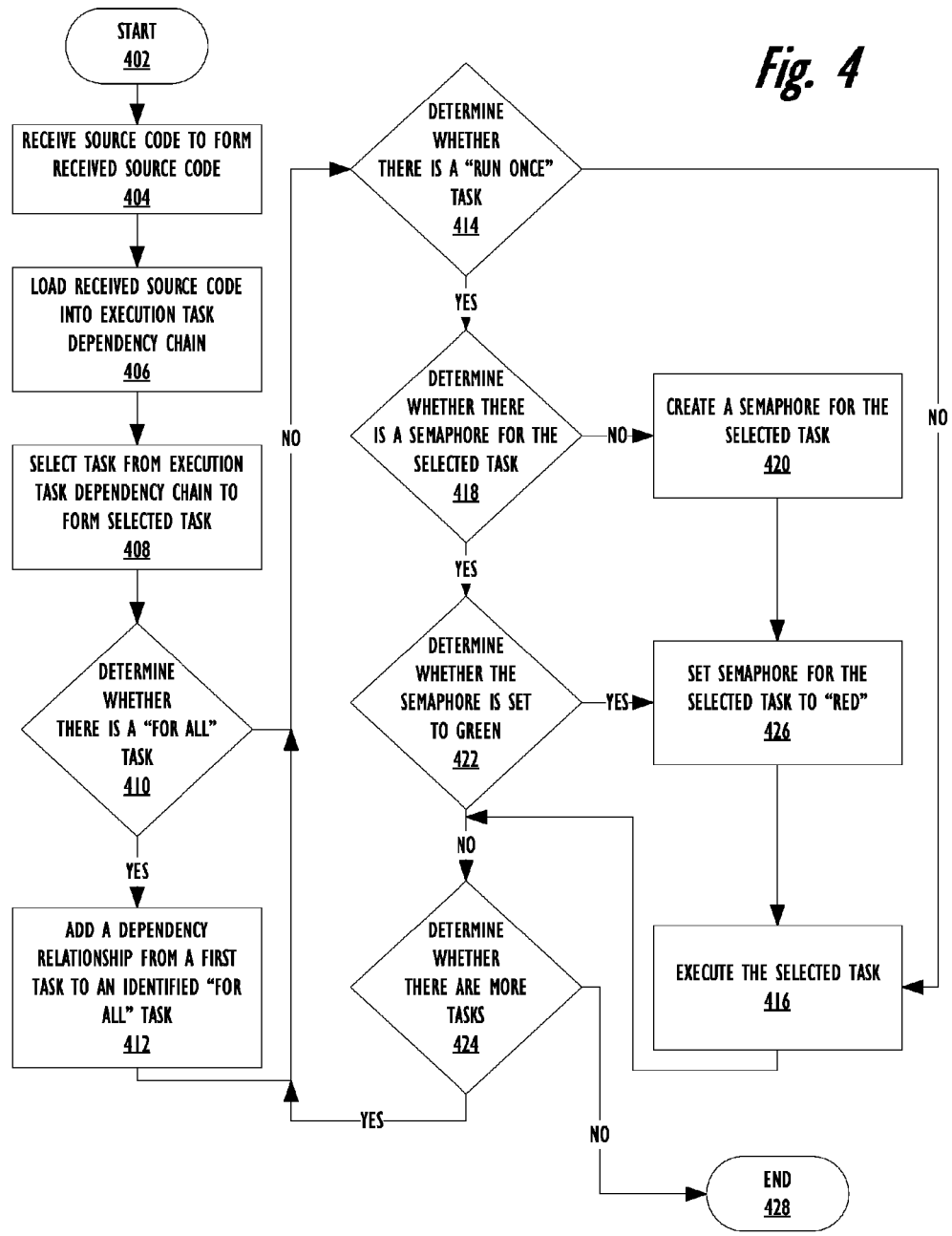
FIG. 4 is a flowchart of an interdependent task management process using the task control system of FIG. 2, in accordance with one embodiment of the disclosure.

With reference to FIG. 4, a flowchart of an interdependent task management process using the task control system of FIG. 2, in accordance with one embodiment of the disclosure is presented. Process 400 is an example of a process using the capabilities of task framework 202 of task control system 200 of FIG. 2.

Process 400 starts (step 402) and receives source code to form received source code (step 404). Process 400 loads the received source code into an execution task dependency chain (step 406). The execution task dependency chain is a prescribed sequence of tasks in which some tasks have a defined dependency upon other tasks. The process of creating the execution task dependency chain typically includes parsing dependencies in the source code, computing an execution sequence for tasks to form an execution task dependency chain, and loading the execution task dependency chain into a memory for subsequent processing.

Select a task from the execution task dependency chain to form a selected task is performed (step 408). Process 400 determines whether there is a "forAll" task (step 410). A "forAll" task is a task that has a type="forAll" and applies to all tasks. For example, a "forAll" task typically establishes an environment applicable to all other tasks. When a determination is made that there is a "forAll" task, a "yes" result is obtained. When a determination is made that there is not a "forAll" task, a "no" result is obtained.

When a "yes" result is obtained in step 410, process 400 adds a dependency relationship from a first task to an identified "forAll" task (step 412). When a "no" result is obtain in step 410, process 400 determines whether there is a "runOnce" task (step 414). A "runOnce" task is a task having a type="runOnce" task. When a determination is made that there is a "runOnce" task, a "yes" result is obtained. When a determination is made that there is not a "runOnce" task, a "no" result is obtained. A task without a type or with a type="none" is treated as a task without a type attribute.

When a "no" result is obtained in step 414, execute the selected task is performed (step 416). Process 400 skips to step 424. When a "yes" result is obtained in step 414 determine whether there is a semaphore for the selected task (step 418). When a determination is made that there is a semaphore for the selected task, a "yes" result is obtained. When a determination is made that there is not a semaphore for the selected task, a "no" result is obtained. When a "no" result is obtained in step 418, process 400 creates a semaphore for the selected task (step 420). Process 400 sets the semaphore for the selected task to "red" or "off" (step 426) executes the selected task (step 416) as before.

When a "yes" result is obtained in step 418, process 400 determines whether the semaphore is set to "green" (step 422). When a determination is made that the semaphore is set to "green," a "yes" result is obtained. When a determination is made that the semaphore is not set to "green" or "on" a "no" result is obtained. When a "yes" result is obtained, process 400 sets the semaphore for the selected task to "red" (step 426) executes the selected task (step 416) as before. When a "no" result is obtained process 400 determines whether there are more tasks to process (step 424). When a determination is made that there are more tasks to process, a "yes" result is obtained. When a determination is made that there are no more tasks to process, a "no" result is obtained.

When a "yes" result is obtained in step 424, process 400 loops back to step 414 to continue processing tasks in the execution task dependency chain. Process 400 iterates through the remaining tasks of the execution task dependency chain to process each task. When a "no" result is obtained in step 424, process 400 terminates (step 428).

Thus the illustrative embodiment defines a computer-implemented process that provides a capability to define, parse and understand the definition of special prerequisite tasks. The capability also provides a method to dynamically add a dependency to a defined general environment setup task, so that the task will be invoked in either a build or a configuration execution mode, and a method to ensure certain tasks are invoked only once per execution cycle. The capability of the task framework typically ensures that a general environment setup task will not execute "run-once" tasks more than once in an execution cycle. The task framework may be used to typically hide the complexity of interdependent task management from the script writers, enabling script users to mark special tasks, and allow the process to be managed by the framework.

Thus is provided, in an illustrative embodiment, a computer-implemented process for interdependent task management selects a task from an execution task dependency chain to form a selected task, wherein a type selected from a set of types including "forAll," "runOnce" and none is associated with the selected task and determines whether there is a "forAll" task. Responsive to a determination that there is no "forAll" task, determines whether there is a "runOnce" task and responsive to a determination that there is a "runOnce" task further determines whether there is a semaphore for the selected task. Responsive to a determination that there is a semaphore for the selected task, the computer-implemented process determines whether the semaphore is "on" for the selected task and responsive to a determination that the semaphore is "on," sets the semaphore "off" and executes the selected task.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for interdependent task management, the computer-implemented process comprising:
    during an execution time:
    loading a plurality of tasks that form an execution task dependency chain from a memory, wherein the plurality of tasks have one or more defined relationships including one or more dependencies that establish a sequence of execution of the plurality of tasks;
    selecting a next task from the plurality of tasks as a selected task, wherein the selected task has one of: no attribute type, a "forAll" attribute type which indicates the selected task applies to all other tasks in the execution task dependency chain, a "runOnce" attribute type which indicates the selected task should be run once per execution cycle, and a "none" attribute type, wherein the lack of presence of an attribute type or a task with the "none" attribute type indicates the selected task should be treated as a task without an attribute type;
    determining whether the selected task has the associated "forAll" attribute type;
    in response to determining the selected task has the associated "forAll" attribute type, dynamically adding a dependency from a first task in the execution task dependency chain to the selected task so that the selected task will be executed in one of a configure mode and a build mode, wherein the task having the "forAll" attribute type is a defined general environment setup task that establishes an environment applicable to all other tasks in the execution task dependency chain and that prevents any tasks in the execution task dependency chain from executing more than once in an execution cycle; and
    executing the selected task, wherein execution of the selected task is managed according to the associated attribute type and any semaphores associated with the selected task, wherein a semaphore is an indicator that provides a status value based on a use of the semaphore;
    wherein any prerequisite tasks to the selected task are executed prior to executing the selected task, wherein the prerequisite tasks include any tasks having the "forAll" attribute type, and wherein when the selected task has a semaphore having a status value set to a first value, the prerequisite tasks further includes one or more prerequisite tasks or processes associated with the semaphore.

2. The computer-implemented process of claim 1, wherein the adding the dependency relationship from the first task in the execution task dependency chain to the selected task further comprises:
    identifying the first task in the execution task dependency chain, wherein the execution task dependency chain starts from one of a user-specified task name and a default task name.

3. The computer-implemented process of claim 1, further comprising:
    in response to determining the selected task has the associated "runOnce" attribute type:

determining whether there is a semaphore associated with the selected task, wherein the semaphore for the selected task is an indicator that provides a signal to one or more other processes; and in response to determining there is not a semaphore associated with the selected task:

creating a new semaphore that is associated with the selected task; and setting a status value of the new semaphore for the selected task to a desired value; and in response to determining there is the semaphore for the selected task, determining the setting of the status value of the semaphore for the selected task.

4. The computer-implemented process of claim 3, further comprising:

in response to determining the status value of the semaphore of the selected task is set to a second value:

determining whether there are additional tasks in the execution task dependency chain;

in response to determining there are additional tasks, selecting a next task from an execution task dependency chain as the selected task; and in response to determining there are no additional tasks, terminating.

5. The computer-implemented process of claim 3, further comprising in response to executing the selected task, determining whether there are additional tasks.

6. The computer-implemented process of claim 3, further comprising:

in response to determining there is the semaphore for the selected task and the status value of the semaphore for the selected task is set to the first value, setting the status value of the semaphore for the selected task to a second value after the selected task is executed, wherein the second status value indicates a status of the selected task after execution.

7. The computer-implemented process of claim 6, wherein:

the first value is on; and the second value is off.

8. The computer-implemented process of claim 6, wherein the status value of the semaphore of the selected task is set to one of a plurality of status values in a range or set of values depending upon associated use of the semaphore.

9. The computer-implemented process of claim 6, wherein:

the first value is green; and the second value is red.

10. The computer-implemented process of claim 1, further comprising:

receiving a source code that contains the plurality of tasks;

parsing the plurality of tasks provided by the source code to check for one or more dependencies;

computing the sequence of execution for the plurality of tasks to form the execution task dependency chain; and loading the execution task dependency chain into the memory.

11. The computer-implemented process of claim 1, further comprising:

identifying one or more tasks of the plurality of tasks in the execution task dependency chain that did not previously have a semaphore; and creating a semaphore for each of the identified one or more tasks.

* * * * *